United States Patent
Suzuki et al.

(10) Patent No.: US 7,839,663 B2
(45) Date of Patent: Nov. 23, 2010

(54) CONVERTER AND POWER CONVERTER THAT BECOMES IT WITH THE CONVERTER

(75) Inventors: Takahiro Suzuki, Hitachi (JP); Yoshitaka Iwaji, Hitachinaka (JP); Tsunehiro Endo, Hitachiota (JP); Yasuo Notohara, Hitachiota (JP); Yoshiaki Kurita, Shizuoka (JP); Tatsuo Ando, Shizuoka (JP); Chikara Tanaka, Hitachi (JP)

(73) Assignee: Hitachi Appliances, Inc., Tokyo (JP)

( * ) Notice: Subject to any disclaimer, the term of this patent is extended or adjusted under 35 U.S.C. 154(b) by 0 days.

(21) Appl. No.: 12/335,867

(22) Filed: Dec. 16, 2008

(65) Prior Publication Data

US 2009/0135630 A1 May 28, 2009

Related U.S. Application Data

(62) Division of application No. 11/213,728, filed on Aug. 30, 2005, now Pat. No. 7,471,525.

(30) Foreign Application Priority Data

Aug. 30, 2004 (JP) .............................. 2004-250068

(51) Int. Cl.
*H02M 5/45* (2006.01)
*H02M 5/458* (2006.01)
(52) U.S. Cl. ....................................................... 363/37
(58) Field of Classification Search .................. 363/37, 363/146; 439/76.2; 361/760–775, 790; 257/690–692, 257/685–686
See application file for complete search history.

(56) References Cited

U.S. PATENT DOCUMENTS

| 4,521,840 | A | * | 6/1985 | Hoadley ....................... 363/35 |
| 5,091,823 | A | * | 2/1992 | Kanbara et al. ............. 361/736 |
| 5,285,029 | A | | 2/1994 | Araki |
| 5,663,627 | A | * | 9/1997 | Ogawa ........................ 363/132 |
| 5,982,136 | A | | 11/1999 | Pelly |
| 2002/0141212 | A1 | | 10/2002 | Ishida |
| 2003/0057003 | A1 | | 3/2003 | Kawada |
| 2005/0105306 | A1 | | 5/2005 | Deng |
| 2005/0264255 | A1 | | 12/2005 | Maruyama |

FOREIGN PATENT DOCUMENTS

| JP | 08-266059 | 10/1996 |
| JP | 2003-289671 | 10/2003 |

OTHER PUBLICATIONS

Mammano, Current Sensing Solutions for Power Supply Designers, 2001, Texas Instruments Incorporated, 1-1-1-34.*

* cited by examiner

*Primary Examiner*—Bao Q Vu
*Assistant Examiner*—Jue Zhang
(74) *Attorney, Agent, or Firm*—Antonelli, Terry, Stout & Kraus, LLP.

(57) ABSTRACT

A converter includes a converter circuit 1 having a plurality of bridge-connected semiconductor switching devices for converting AC power into DC power, a smoothing condenser connected in parallel to the DC side of the converter circuit and a current detector provided in a condenser circuit to control a condenser current flowing through the smoothing condenser to be a set value. The condenser current is controlled to be the set value (e.g. zero) to thereby reduce the capacity of the smoothing condenser and make the converter small.

12 Claims, 13 Drawing Sheets

US 7,839,663 B2

CONVERTER AND POWER CONVERTER THAT BECOMES IT WITH THE CONVERTER

CROSS REFERENCE TO RELATED APPLICATION

"This application is a divisional application of U.S. application Ser. No. 11/213,728, filed Aug. 30, 2005, now U.S. Pat. No. 7,471,525, the contents of which are incorporated herein by reference."

BACKGROUND OF THE INVENTION

The present invention relates to a converter that converts AC (alternating current) power into DC (direct current) power and a power converter that becomes it with the converter to produce AC power having any frequency and voltage.

In a driving system of an electric motor, it is necessary to change a frequency of AC power to any frequency in order to control a rotational speed of the motor freely and a power converter using semiconductor switching devices such as insulated gate bipolar transistors (IGBTs) is used therefor. Most of such power converters each include a converter for converting AC power into DC power and an inverter for converting the DC power produced by the converter into AC power having any frequency and voltage.

However, since a DC voltage is varied due to unequalness of the DC power transferred between the converter and the inverter, a smoothing condenser is provided in a DC circuit connecting therebetween to suppress the variation of the DC voltage. Generally, an electrolytic condenser used as the smoothing condenser is very large in the volume as compared with semiconductor switching devices and accordingly the percentage of the volume of the smoothing condenser occupying the power converter is increased. Therefore, if the capacity of the smoothing condenser is reduced, the power converter can be made small.

Heretofore, in order to reduce the capacity of the smoothing condenser, Japanese Patent Publication JP-A-2003-102177, for example, discloses that an input current and a DC input current based on a current command for an inverter are presumed and an AC input current of the converter is controlled so that a DC output current of a converter is equal to the DC input current of the inverter. Further, Japanese Patent Publication JP-A-7-79567 discloses that an active filter is connected in parallel to a smoothing condenser and a compensation current of the active filter is controlled so that DC voltage variation is absorbed.

SUMMARY OF THE INVENTION

However, an apparatus disclosed in JP-A-2003-102177 requires a lot of detectors for detecting AC input current, DC voltage, AC output current, rotational speed and the like and accordingly there sometimes occurs a problem that the volume of the apparatus is increased due to added detectors besides making small the smoothing condenser.

Further, an apparatus disclosed in JP-A-7-79567 requires detectors for detecting input current, AC voltage, DC voltage and DC current in order to control the compensation current and there is a problem that the apparatus is made large and control is also complicated. Particularly, the AC voltage detector and the input current detector have a reference potential different from that of the DC voltage detector and accordingly, an insulation circuit is required. Further, since a circuit constant of the active filter depends on a circuit constant on the input side, there is no generality.

It is a first object of the present invention to provide a converter that can reduce the capacity of a smoothing condenser connected to a DC circuit without increasing the number of detectors.

Furthermore, it is a second object of the present invention to provide a small-sized and packaged power converter including an inverter and the converter of the present invention used as a DC source.

In order to achieve the first object, the converter according to the present invention comprises a converter circuit including a plurality of bridge-connected semiconductor switching devices for converting AC power into DC power, a smoothing condenser connected in parallel to DC side of the converter circuit and a current detector provided in a condenser circuit to control a condenser current flowing through the smoothing condenser to be a set value.

More particularly, the condenser current flowing through the smoothing condenser is detected to control the condenser current to be the set value (e.g. zero), so that the capacity of the smoothing condenser can be reduced and the converter can be made small. In order to control the condenser current to be the set value, the plurality of bridge-connected semiconductor switching devices constituting the converter circuit may be controlled. Concretely, it can be realized by providing q-axis current control means that controls a q-axis current component of the DC current of the converter circuit so that a difference between the condenser current and the set value is reduced.

Further, in order to control the converter, information of the AC current on the input side is required usually, although when an AC input current of the converter circuit is detected, the number of detectors are increased. Accordingly, it is considered that the DC current of the converter (or inverter) contains information about the AC current and a DC current detector for detecting the DC current of the converter circuit is provided. Calculation means for calculating the AC current on the input side of the converter circuit on the basis of the DC current detected by the DC current detector and operation states of the plurality of semiconductor switching devices is provided to make it possible to suppress the number of detectors from being increased.

Moreover, it is desired to provide compensation means for calculating the q-axis current component of the AC current on the basis of the AC current calculated by the calculation means of the AC current on the input side and feeding back the q-axis current component of the AC current to correct a q-axis current command value of the q-axis current control means.

The condenser current detector and the DC current detector can use shunt resisters.

Further, the converter of the present invention is preferably of packaged type comprising a main circuit board in which a converter circuit including a plurality of bridge-connected semiconductor switching devices for converting AC power into DC power is formed, a controller board in which a controller for controlling the plurality of semiconductor switching devices is formed, a package in which the main circuit board is provided and on which the controller board is placed to connect therebetween, an external terminal for a smoothing condenser connected in parallel to DC side of the converter circuit and which is mounted at periphery of the package and a current detector connected between the external terminal and the converter circuit. Consequently, the capacity of the smoothing condenser can be reduced and the whole converter apparatus can be made small.

In order to achieve the second object, the power converter of packaged type according to the present invention comprises a main circuit board in which two sets of power converter circuits each including a plurality of bridge-connected semiconductor switching devices are connected to each other through a DC circuit, a controller board in which a controller for controlling the plurality of semiconductor switching devices for the two sets of power converter circuits is formed and a package in which the main circuit board is provided and on which the controller board is placed to connect therebetween. The package includes two sets of AC terminals connected to the two sets of power converter circuits, respectively, an external terminal for a smoothing condenser connected in parallel to the DC circuit and an external terminal connected to the controller and all the terminals are disposed at periphery of the package. The main circuit board includes at least two current detectors for detecting a DC current flowing through the external terminal for the smoothing condenser and DC currents in the power converter circuits.

As configured above, the effects of the converter according to the present invention can be attained and the power converter including the converter and the inverter can be made small without increasing detectors as described below. That is, the junction of the DC circuit connecting two sets of power converter circuits and the smoothing condenser is a so-called Y connection. Accordingly, it is not always necessary to detect the DC current flowing through the smoothing condenser and the DC currents flowing through the two sets of power converter circuits and if two of these currents are detected, the remaining one current can be calculated. In other words, there may be provided current calculation means for calculating a current in a part where a current detector is not provided on the basis of two current values detected by at least two current detectors. This current calculation means can be realized by calculation means such as a microcomputer and a digital signal processor (DSP). It is possible not to provide a detector for a condenser current flowing through the smoothing condenser and in this case the condenser current can be calculated on the basis of a difference between the converter DC current and the inverter DC current.

Particularly, since electric power containing all losses produced in the portion from the smoothing condenser to the load side is supplied to the power converter circuit side corresponding to the converter, the DC current on the converter side is larger than that on the inverter side. Further, since only switching ripple in the power converter circuit flows through the smoothing condenser basically, the absolute value of the current flowing through the smoothing condenser is very small as compared with the two power converter circuits. Accordingly, it is desired to provide two current detectors for detecting the DC current of the power converter circuit corresponding to the inverter and the condenser current of the smoothing condenser. Consequently, the loss of the current detector can be reduced.

Further, in the power converter of packaged type according to the present invention, the controller controls one of the power converter circuits, that is, the plurality of semiconductor switching devices of the power converter circuit corresponding to the converter to control the condenser current to be the set value. Moreover, when the current detectors are configured by means of shunt resistors, an amplifier such as an operational amplifier (OP) can be used to convert current information into an electrical signal simply. In this case, it is desired to connect one ends of two to three current detectors to the same potential. That is, one ends of the current detectors can be connected in common to the negative line (N-line) of the smoothing condenser as a reference potential to form the configuration that is not influenced by scattered detection values of the current detectors due to disposition of semiconductor switching devices and wiring resistance and variation of the reference potential due to noise. This configuration is the same even in the case where the shunt resistor is used and even in the case where non-contact type current sensor is used.

In the power converter of packaged type according to the present invention, the controller includes decision means for deciding an AC terminal connected to an AC power supply on the basis of a detected current of the at least one current detector and means for controlling to operate the power converter circuit connected to the AC power supply as a converter and to operate the other power converter circuit as an inverter on the basis of decision result of the decision means. In other words, when the power supply is turned on, an initial charging current flows through the smoothing condenser and accordingly this initial charging current can be observed to thereby decide which of external terminals connected to two sets of power converter circuits the AC power supply is connected to.

After the initial charging current is ended or disappears, the controller includes, instead of observing the initial charging current, decision means for deciding an AC terminal connected to an AC power supply on the basis of detected currents of the two current detectors after the semiconductor switching devices of lower arms for one of the two sets of power converter circuits are turned on and means for controlling to operate the power converter circuit connected to the AC power supply as a converter and to operate the other power converter circuit as an inverter on the basis of decision result of the decision means.

As described above, since the power converter of packaged type according to the present invention can configure the converter and the inverter symmetrically about the smoothing condenser, the power converter can be operated even if which of the power converter circuits the AC power supply is connected to. Accordingly, the degree of freedom such as arrangement of the power converter and rearrangement suitable for space thereof is improved remarkably.

The power converter of packaged type according to the present invention can be incorporated as one component of a system for driving a motor for a compressor in a packaged air-conditioner, for example.

According to the present invention, there can be realized the converter that can reduce the capacity of the smoothing condenser connected to the DC circuit without increasing detectors.

Further, the power converter including the inverter that uses the converter of the present invention as a DC power supply can be made small and be packaged.

Other objects, features and advantages of the invention will become apparent from the following description of the embodiments of the invention taken in conjunction with the accompanying drawings.

DESCRIPTION OF THE EMBODIMENTS

The present invention is now described with reference to embodiments.

Embodiment 1

Figure 1:
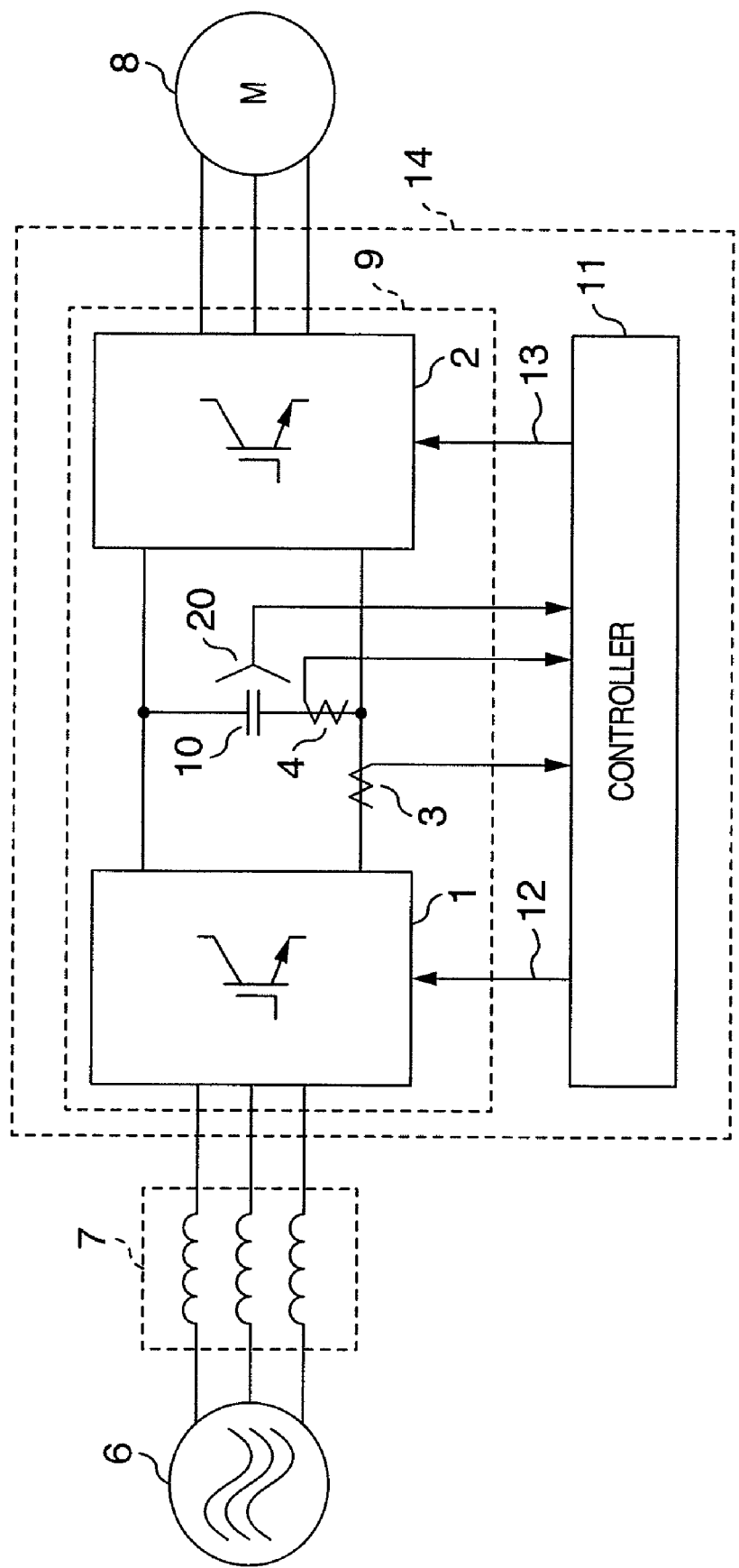
FIG. 1 is a basic configuration diagram illustrating an embodiment of a power converter that uses a converter according to the present invention.
Figure 2:
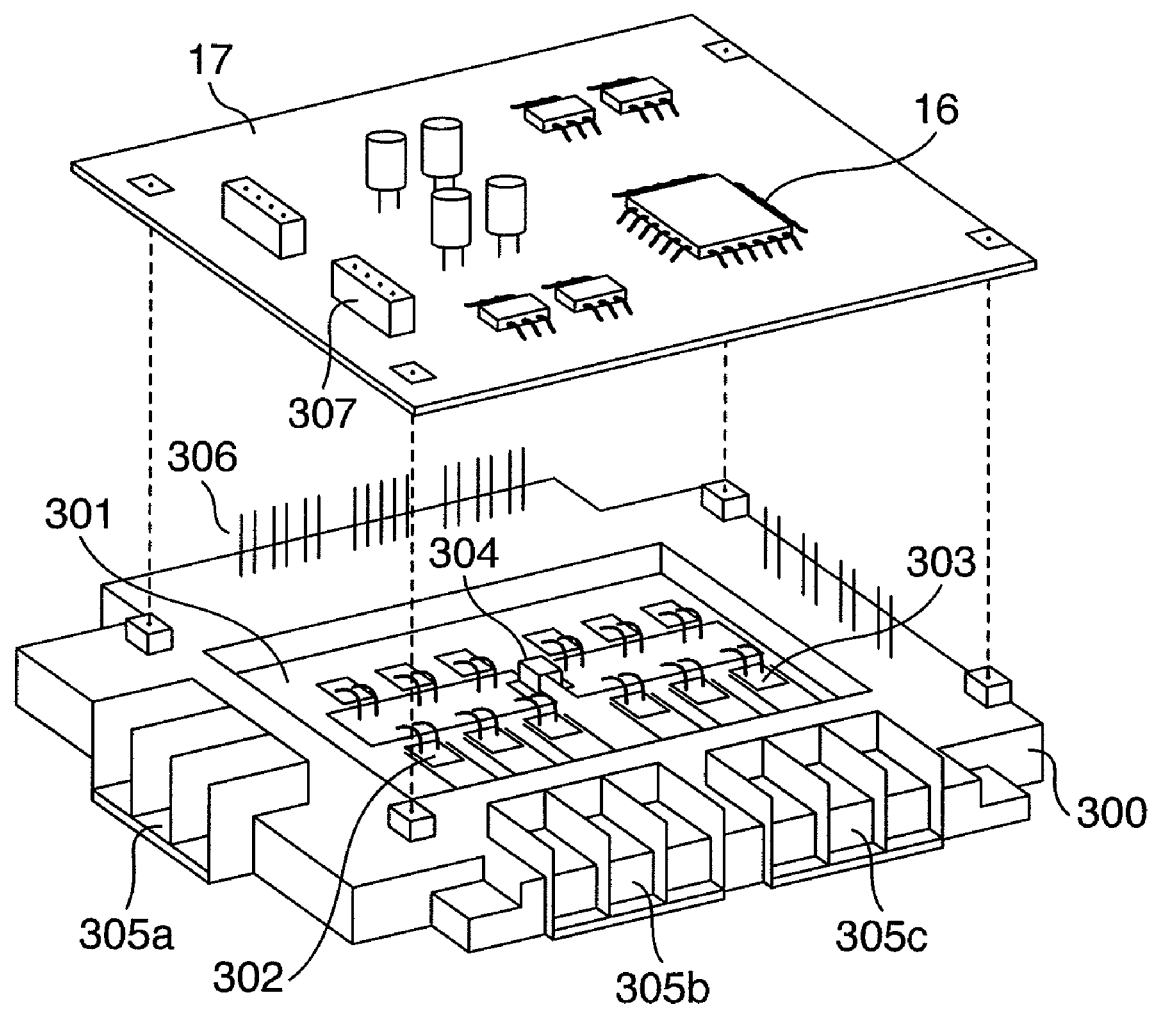
FIG. 2 is an exploded perspective view of a package of the power converter shown in FIG. 1.
Figure 3:
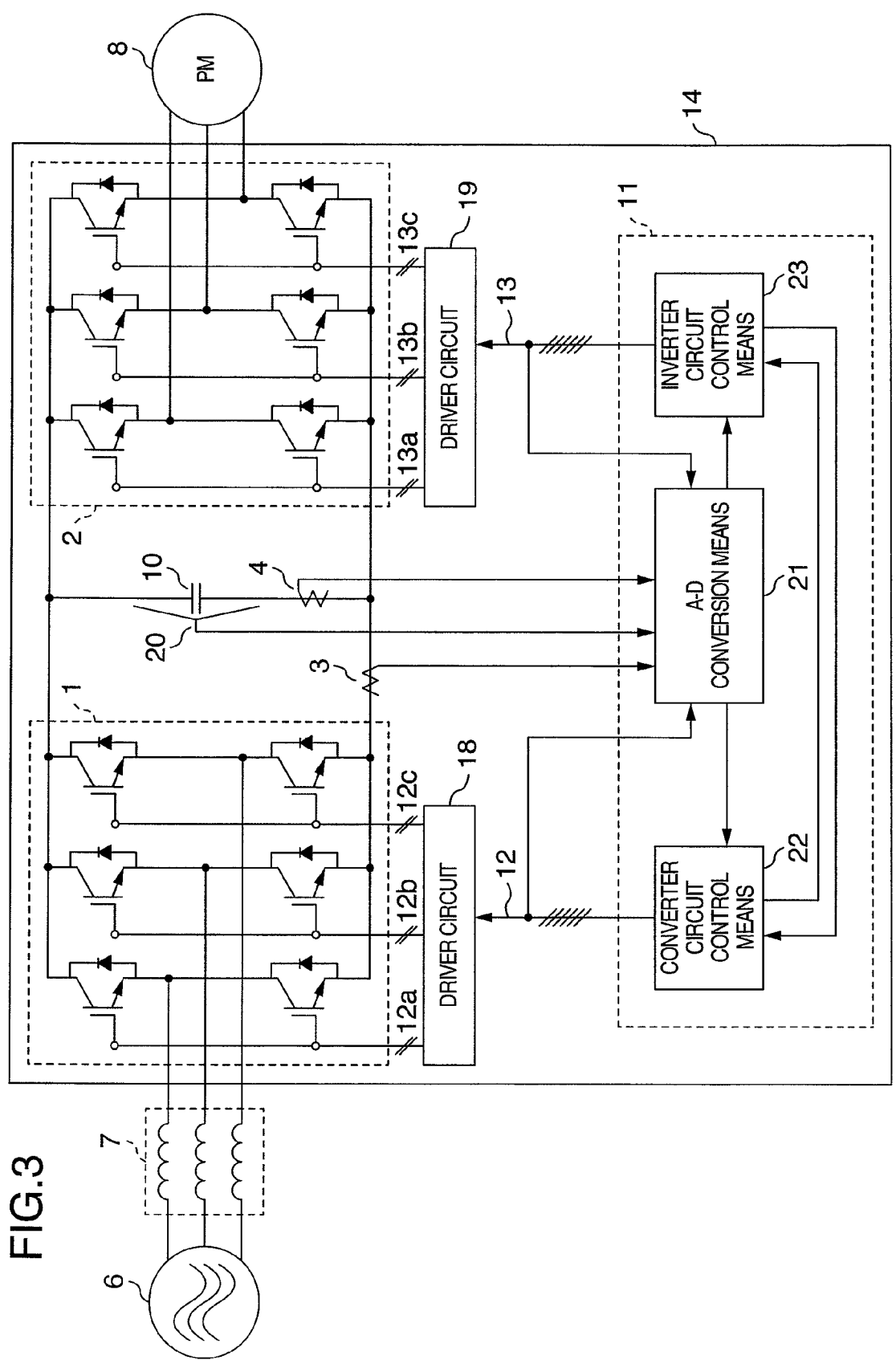
FIG. 3 is a detailed configuration diagram illustrating the power converter of FIG. 1.
Figure 4:
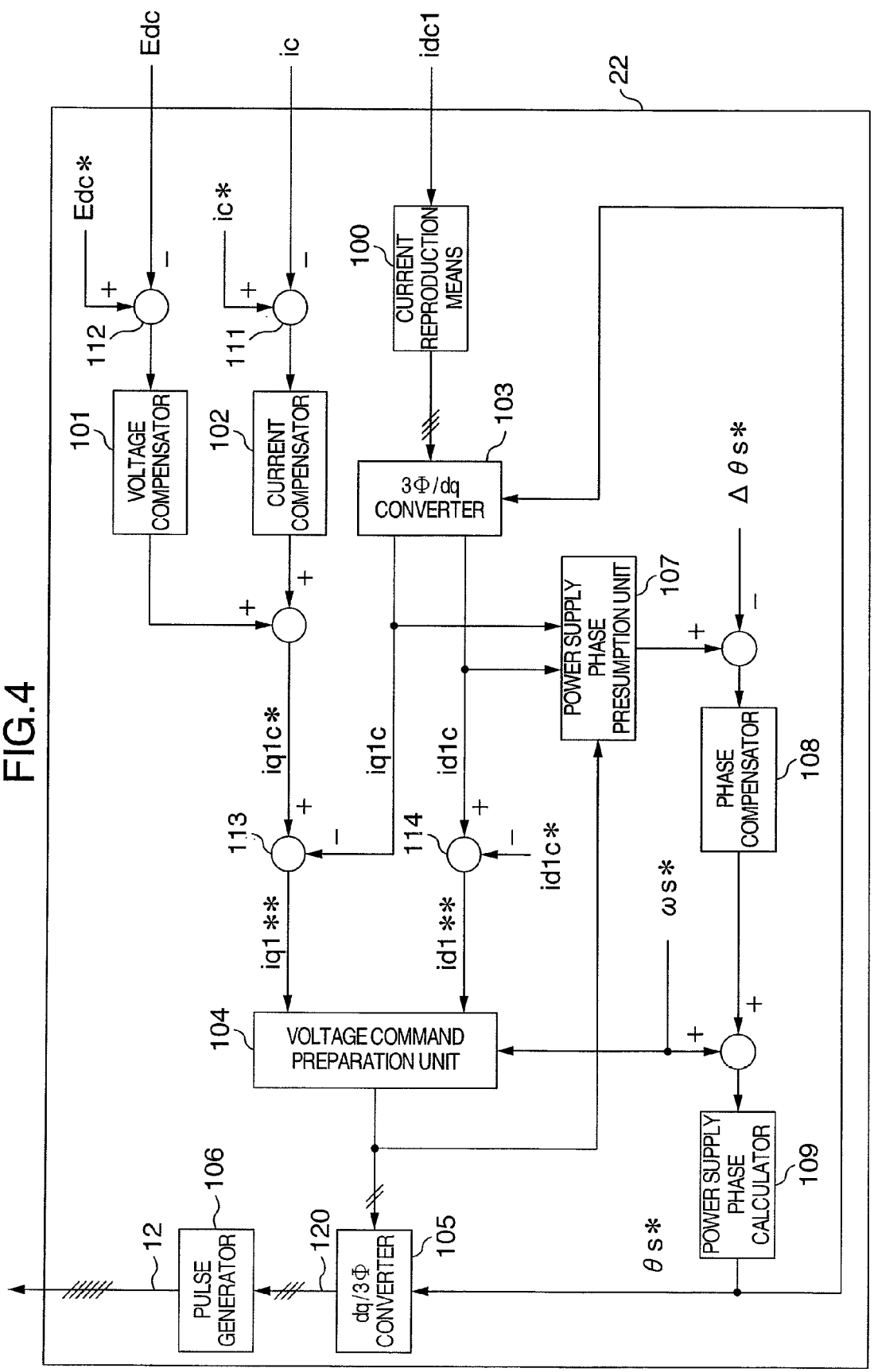
FIG. 4 is a detailed configuration diagram illustrating converter circuit control means used in the power converter of FIG. 3.
Figure 6:
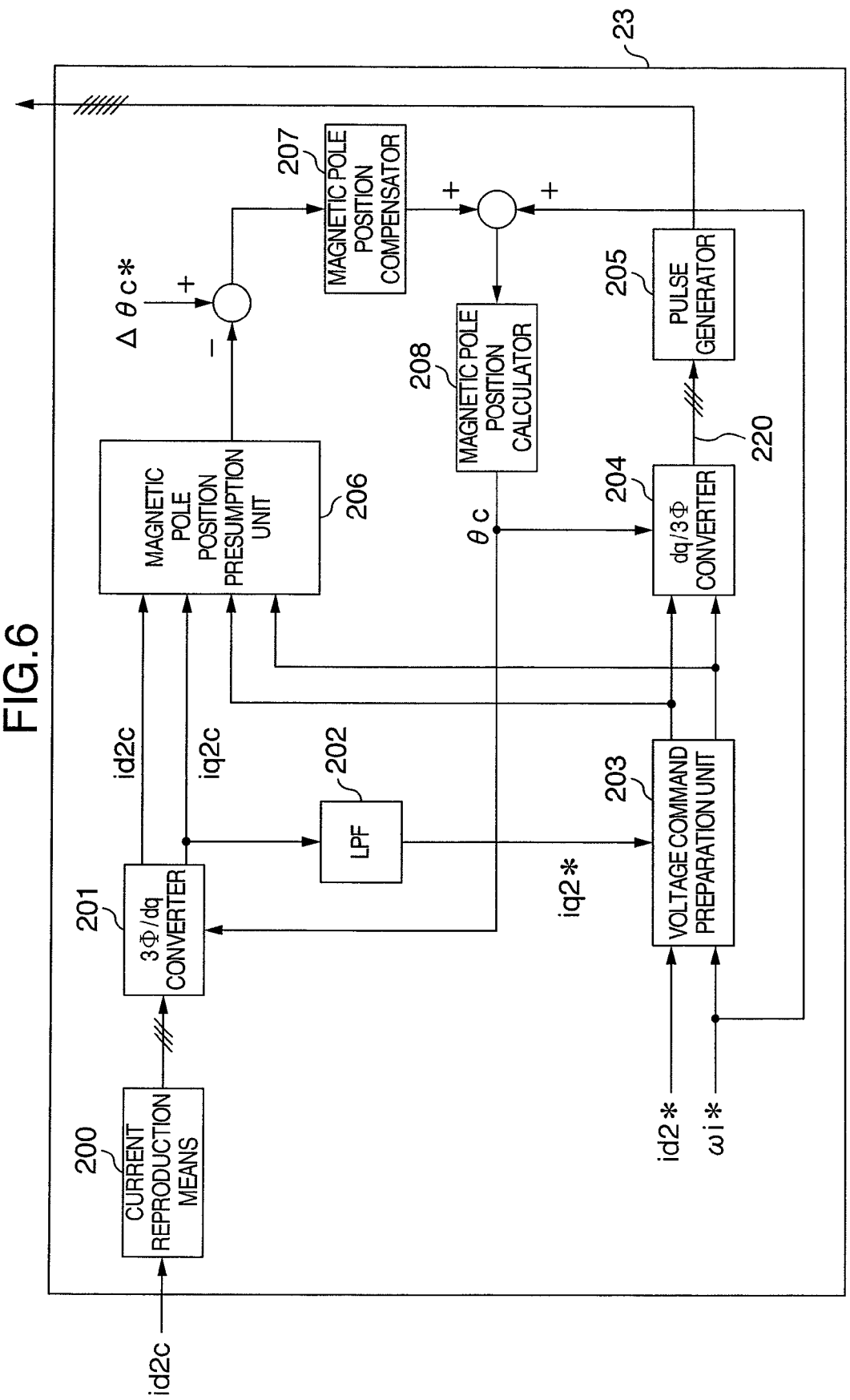
FIG. 6 is a detailed configuration diagram illustrating inverter circuit control means used in the power converter of FIG. 3.

FIG. 1 is a basic configuration diagram illustrating an embodiment of a power converter that uses a converter according to the present invention to produce AC power having any frequency and voltage. FIG. 2 is an exploded perspective view of a package of the power converter shown in FIG. 1. FIG. 3 is a detailed configuration diagram illustrating the power converter of FIG. 1. FIG. 4 is a detailed configuration diagram illustrating converter circuit control means used in the power converter of FIG. 3. FIG. 6 is a detailed configuration diagram illustrating inverter circuit control means used in the power converter of FIG. 3.

As shown in FIG. 1, the power converter 14 includes, broadly divided, a power unit 9 and a control unit 11. The power unit 9 includes a converter circuit 1, a smoothing condenser 10 connected across the DC output of the converter circuit 1 and an inverter circuit 2 connected to the DC output of the converter circuit 1. The converter circuit 1 is connected to an AC power supply 6 through reactors 7 and converts AC power supplied through the reactors 7 into DC power. The inverter circuit 2 converts the DC power supplied from the converter circuit 1 through the smoothing condenser into AC power to supply the AC power to a motor 8.

Further, a current detector 3 for detecting a current flowing through the DC side of the converter 1 and a current detector 4 for detecting a current flowing through the smoothing condenser 10 are provided in the negative side (N-line) of a DC circuit that is connected between the converter circuit 1 and the inverter circuit 2. Moreover, a voltage detector 20 for detecting a DC voltage across the smoothing condenser 10 is provided. On the other hand, the control unit 11 includes a controller for controlling the converter circuit 1 and the inverter circuit 2. The control unit 11 produces pulse signals 12 and 13 on the basis of current information detected by the current detectors 3 and 4 and drives the converter circuit 1 and the inverter circuit 2 by the pulse signals.

As shown in FIG. 2 as the exploded perspective view, the power converter 14 can incorporate the power unit 9 and the control unit 11 into a single module to be integrally formed. More particularly, the power unit 9 composed of the converter circuit 302 and the inverter circuit 303 that are connected through the DC circuit is mounted on a main circuit board 301 made of aluminum and the main circuit board 301 is mounted within a depression portion of a package 300 formed into a square. On the other hand, the control unit 11 including one-chip microcomputer 16 for controlling a plurality of semiconductor switching devices of the power unit 9 is mounted on a sub-board 17 and the sub-board 17 is placed on one side of the package 300 so that the control unit 11 is connected to the power unit 9 to thereby form a packaged-type power converter 14. The microcomputer 16 may use a digital signal processor (DSP).

The package 300 is equipped with at its periphery AC terminals 305a connected to the converter circuit 302, AC terminals 305c connected to the inverter circuit 303, external terminals 305b connected to the smoothing condenser and external terminals 306 for connecting the converter circuit 302 and the inverter circuit 303 to the controller of the control unit 11. That is, in the embodiment, the smoothing circuit is structured to be connected externally. Further, the sub-board 17 is equipped with connectors 307 connected to external controller such as higher-rank controller. Moreover, the main circuit board 301 is equipped with two current detectors for detecting a current flowing through the external terminals 305b for the smoothing condenser and a current flowing through the DC side of the converter circuit 302. As apparent from the DC circuit of FIG. 1, since the DC circuit of N-line and the smoothing condenser are connected into so-called Y-connection, only two of three current detectors for detecting the current flowing through the smoothing condenser, the current flowing through the DC side of the converter circuit 302 and the current flowing through the DC side of the inverter circuit 303 can be provided to thereby calculate the remaining one current.

As shown in FIG. 2, in the packaged-type power converter 14 of the embodiment, the power system including the semiconductor switching devices and the control system including the microcomputer 16 and the like are disposed separately from each other so that the control system is not influenced by noise generated from the power system. Further, the semiconductor switching devices mounted on the main circuit board 301 are not limited to bare-chips but packaged parts may be mounted instead thereof. Moreover, a shield plate can be disposed between the semiconductor switching devices of the power system and the microcomputer 16 of the control system, so that the control system of the microcomputer 16 and the like can be mounted on single main circuit board 301 together with the semiconductor switching devices of the power system. Furthermore, when it is desired to increase or reduce the capacity of the power converter 14, components can be exchanged easily so that only the power unit, for example, is changed and simplicity of maintenance is improved.

FIG. 3 schematically illustrates the power converter 14 shown in FIG. 1 in detail. As shown in FIG. 3, the converter circuit 1 and the inverter circuit 2 use insulated gate bipolar transistors (IGBTs) as the plurality of bridge-connected semiconductor switching devices. The IGBTs of the converter circuit 1 constitute upper and lower arms or sides for R-, S- and T-phases. The junctions of the upper and lower arms for the phases are connected to the AC power supply 6 through the reactors 7. The converter circuit 1 amplifies first PWM (pulse width modulation) signals 12 by means of a first driver circuit 18 and applies the amplified PWM pulse signals 12a to 12c to the IGBTs for the phases. The IGBTs make switching operation in response to the PWM pulse signals 12a to 12c. The converter circuit 1 is to convert AC power into DC power in response to the switching operation and make wave-shaping of the input current and boosting of the DC voltage. In the embodiment, there is not provided a detector for the AC input current, although the AC input current is calculated on the basis of the DC current detected by the current detector 3 connected on the way of passage of the current flowing through the DC side of the converter circuit 1 and the operation states of the IGBTs of the upper and lower arms for the R-, S- and T-phases. Concrete calculation method thereof will be described later. Further, the converter circuit 1 can make regeneration operation that DC power is converted into AC power to return it to the AC power supply 6.

The smoothing condenser 10 smoothes the DC power produced by the converter circuit 1. The condenser current flowing through the smoothing condenser 10 is detected by the current detector 4.

The IGBTs of the inverter circuit 2 constitute upper and lower arms or sides for U-, V- and W-phases in the same manner as the converter circuit 1 and the junctions of the upper and lower arms for the phases are connected to the motor 8. The motor 8 has a rotor made of a permanent magnet and a plurality of windings disposed around the rotor to form AC magnetic field. The inverter circuit 2 amplifies PWM pulse signals 13 by means of a driver circuit 19 and applies the amplified PWM pulse signals to the IGBTs for the phases. The IGBTs make switching operation to thereby convert the DC power smoothed by the smoothing circuit 10 into the AC power having a designated voltage and frequency and the converted AC power is supplied to the motor 8. In the embodiment, a detector for detecting an AC current flowing through the motor 8 is not provided, although a current flowing through the DC side of the inverter circuit 2 is calculated on the basis of the currents detected by the current detectors 3 and 4 and the AC current is calculated on the basis of the calculated current and the operation states of the IGBTs of the upper and lower arms for the U-, V- and W-phases. Concrete calculation method thereof will be described later.

The controller 11 includes an analog-to-digital (A-D) conversion means 21, converter circuit control means 22 and inverter circuit control means 23. The A-D conversion means 21 includes an amplifier such as an operational amplifier for amplifying signals from the current detectors 3 and 4 and an analog-to-digital (A-D) converter that operates while using any of the PWM signals 12 and the PWM signals 13 as a timing signal for receiving an analog value. The A-D converter has sample-and-hold function and A-D conversion function and is formed in a single semiconductor integrated circuit constituting the controller 11. The A-D converter converts the received analog value into a digital value and supplies the digital value to the converter circuit control means 22 and the inverter circuit control means 23.

The converter circuit control means 22 is supplied with a DC voltage Edc detected by the voltage detector 20 that detects the voltage across the smoothing condenser 10, a converter DC current idc1 detected by the current detector 3 and a condenser current ic detected by the current detector 4 through the A-D conversion means 21 and produces the PWM signals 12 to supply the PWM signals 12 to the driver circuit 18 of the converter circuit 1 so that the condenser current ic is minimized and a predetermined DC voltage is produced. Further, the inverter circuit control means 23 receives the converter DC current idc1 detected by the current detector 3 and the condenser current ic detected by the current detector 4 through the A-D conversion means 21 to calculate an inverter DC current idc2 and produces the PWM signals 13 to supply the PWM signals 13 to the driver circuit 19 of the inverter circuit 2 so that the AC power having the designated frequency and voltage is produced. Further, the converter circuit control means 22 and the inverter circuit control means 23 are configured to be able to transmit and receive various data therebetween, so that cooperation control between the converter circuit 1 and the inverter circuit 2 can be attained.

In this connection, when shunt resistors are used as the current detectors 3 and 4, one ends of the two shunt resistors are connected to the N-line side connected to the smoothing condenser 10 and the other ends thereof are connected to the A-D conversion means 21. Consequently, even if the reference potential is varied due to external noise or the like, the relative relation between the two current detectors is not changed and accordingly relative error can be reduced. Further, the current detectors 3 and 4 are not limited to the shunt resistors and can use current transformers (CT), Hall-effect elements or the like. Even in this case, detection of currents can be made using the same potential as the reference potential.

FIG. 4 schematically illustrates the converter circuit control means 22 constituting the converter that is characteristic of the present invention. The converter circuit control means 22 includes a voltage loop for calculating a voltage command value and a phase loop for presuming a phase of the power supply.

The voltage loop for calculating the voltage command includes current reproduction means 100 for calculating three-phase AC currents for R-, S- and T-phases on the basis of the converter DC current idc1 of the converter circuit 1, a voltage compensator or voltage controller 101 for suppressing a deviation between the DC voltage Edc and a DC voltage command value Edc* to zero, a current compensator or current controller 102 for suppressing a deviation between the condenser current ic flowing through the smoothing condenser 10 and a condenser current command value ic* to zero, a 3Φ/dq converter 103 for converting the three-phase AC currents into d1-axis current and q1-axis current by means of dq conversion, and a voltage command preparation unit 104 for preparing voltage command values (Vdc1* and Vqc1*).

Further, the phase loop for presuming the phase of the power supply includes a power supply phase presumption unit 107 for presuming the phase of three-phase AC power supply on the basis of output of the 3Φ/dq converter 103, a phase compensator 108 for suppressing a deviation between a power supply phase error Δθs presumed by the power supply phase presumption unit 107 and a power supply phase error command value Δθs* to zero and a power supply phase calculator 109 for calculating the phase of the power supply. In FIG. 4, the condenser current command value ic*, the DC voltage command value Edc*, the power supply phase error command value Δθs* and power supply angular speed command value ωs* are previously given in the converter circuit control means 22. However, the present invention is not limited thereto but the above command values may be supplied externally by means of higher-rank control means, communication or the like.

The voltage command values Vdc1* and Vqc1* for d1- and q1-axes produced by the voltage command preparation unit 104 are coordinate-converted into voltage command values for three-phase axis by means of a dq/3Φ converter 105 on the basis of the power supply phase θs* calculated by the power supply phase calculator 109 to be supplied to a pulse generator 106. The pulse generator 106 prepares the PWM pulse signals 12 on the basis of the voltage command values to supply the PWM pulse signals to the driver circuit 18.

Next, operation of the converter circuit control means 22 is described. The condenser current ic detected by the current detector 4 is converted into a digital signal by the A-D conversion means 21 and is supplied to the converter circuit control means 22. The condenser current ic is compared with the condenser current command ic* in a subtractor 111 and a difference Δic therebetween is supplied to the current compensator 102. The condenser current command ic* is usually zero. The current compensator 102 makes proportional control, for example, and produces a command value of a q1-axis current component for compensating or suppressing the difference Δic to zero. Consequently, the condenser current ic can be controlled to be minimum to thereby reduce the capacity of the smoothing condenser 10.

On the other hand, the DC voltage Edc detected by the voltage detector 20 is converted into a digital signal by the A-D conversion means 21 and is supplied to the converter circuit control means 22. The supplied DC voltage Edc is compared with the DC voltage command value Edc* in a subtractor 112 and a difference ΔEdc therebetween is supplied to the voltage compensator 101. The voltage compensator 101 makes integral control, for example, and produces command value of q1-axis current component for compensating or suppressing the difference ΔEdc to zero. Consequently, the DC voltage Edc can be controlled to a predetermined value. Outputs of the current compensator 102 and the voltage compensator 101 are added to thereby obtain a q1c-axis current command iq1c* and this q1c-axis current command iq1c* is supplied to a subtractor 113.

The subtractor 113 is supplied with a q1-axis current iq1c converted by the 3Φ/dq converter 103 on the basis of the AC input current reproduced by the current reproduction means 100. The subtractor 113 calculates a difference between the current command iq1c* and the q1-axis current iq1c and supplies the difference to the voltage command preparation unit 104 as a q1-axis current command iq1**.

Figure 5:
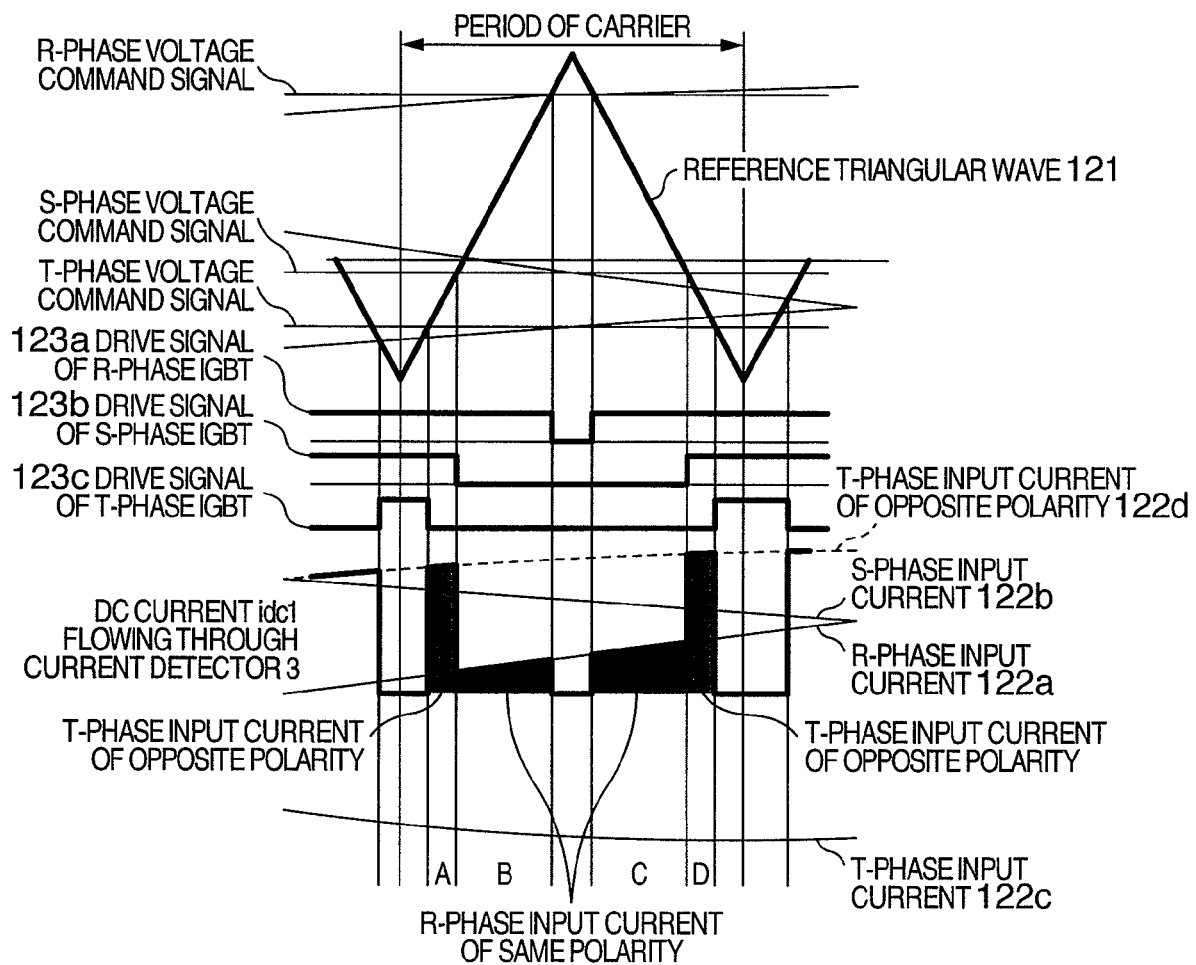
FIG. 5 is a diagram explaining operation of AC current reproduction means of FIG. 4.

The current reproduction means 100 is now described. The current reproduction means 100 is supplied with the converter DC current idc1 detected by the current detector 3 and converted into the digital signal by the A-D conversion means 21. The current reproduction means 100 reproduces the AC input current on the basis of the supplied converter DC current idc1 and the PWM pulse signals 12 representing the operation states of the IGBTs of the converter circuit 1 as shown in FIG. 5. That is, as shown in FIG. 5, the converter DC current idc1 detected by the current detector 3 is varied in response to switching states of the IGBTs for respective phases. A reference triangular wave 121, three-phase voltage command signals 120, PWM pulse signals 12 for respective phases, input currents 122a to 122d for respective phases and DC current idc1 flowing through the current detector 3 are shown in FIG. 5. In FIG. 5, when drive signals 123a to 123c of IGBTs for respective phases are high level, the upper arms for respective phases are on and when the drive signals are low level, the lower arms for respective phases are on. In FIG. 5, for clarification, dead time is not shown, although practically dead time is provided to prevent the upper and lower arms for respective phase from being short-circuited.

In FIG. 5, T-phase input current of opposite polarity can be observed in sections A and D that the only lower arm for T-phase is on and the upper arms for R- and S-phases are on. Further, R-phase input current of the same polarity can be observed in sections B and C that the lower arms for S- and T-phases are on and the only upper arm for R-phase is on. In this manner, the converter DC currents in respective sections can be observed and combined to thereby reproduce the three-phase input currents.

The reproduced input currents are supplied to the 3Φ/dq converter 103. The 3Φ/dq converter 103 coordinate-converts the three-phase AC current reproduced as the input current into the d1-axis current and the q1-axis current in accordance with the power supply phase θs* and produces the coordinate-converted d1c-axis current id1c and q1c-axis current iq1c. The d1c-axis current id1c is supplied to a subtractor 114, which calculates a difference between the d1c-axis current id1c and a d1c-axis current command id1c* to produce a d1-axis current command id1** and supply it to the voltage command preparation unit 104.

The voltage command preparation unit 104 makes vector operation in accordance with the following expressions (1) on the basis of the d1-axis current command id1, the q1-axis current command iq1 and the power supply angular speed command ωs* previously given to produce d1-axis voltage command Vd1* and q1-axis voltage command Vq1* and supply them to the dq/3Φ converter 105 and the power supply phase presumption unit 107.

$$Vd1^* = R1c \times id1^{**} - \omega s^* \times Lq1 \times iq1^{**}$$

$$Vq1^* = R1c \times iq1^{**} + \omega s^* \times Ld1 \times id1^{**} + \omega s^* \times Ka \quad (1)$$

where R1c is a winding resistance of the reactor 7, Ld1 an inductance of the reactor 7 for the d1-axis, Lq1 an inductance of the reactor 7 for the q1-axis and Ka a phase voltage of the power supply.

The dq/3Φ converter 105 coordinate-converts the d1-axis voltage command Vd1* and the q1-axis voltage command Vq1* into three-phase voltage command signals 120. The pulse generator 106 generates the PWM pulse signals 12 for driving the IGBTs for the respective phases of the converter circuit 1 on the basis of the three-phase voltage command signals 120.

On the other hand, the power supply phase presumption unit 107 uses the d1c-axis current idc1 and the q1c-axis current iqc1 supplied from the 3Φ/dq converter 103 and the d1-axis voltage command Vd1* and the q1-axis voltage command Vq1* supplied from the voltage command preparation unit 104 to calculate an error Δθsc between the power supply phase θs of the AC power supply 6 and a current AC power supply phase θsc held by the converter circuit control means 22 as a deviation from the d1-axis. The error Δθsc is subtracted from the power supply phase error command Δθs* and a difference thereof is subjected to proportional-plus-integral control in the phase compensator 108, so that the phase compensator 108 produces an angular speed error Δθsc. The angular speed error Δθsc produced by the phase compensator 108 is added to the power supply angular speed command ωs* to calculate the sum thereof. The sum is integrated by the power supply phase calculator 109, so that the power supply phase θs can be presumed. The presumed power supply phase θs is supplied to the 3Φ/dq converter 103 and the voltage command preparation unit 104 to be used in respective operations of the 3Φ/dq converter 103 and the voltage command preparation unit 104.

As described above, in the converter circuit control means 22, the error Δθsc between the power supply phase θs of the AC power supply 6 and the power supply phase θsc held by the converter circuit control means 22 is calculated and the power supply phase command Δθs* is corrected by means of the phase locked loop (PLL) method so that the calculated power supply phase error Δθsc is reduced to zero to thereby presume the power supply phase θsc. The correction is made by adding the angular speed error Δωs to the power supply angular speed command ωs*.

On the other hand, as shown in FIG. 6, the inverter circuit control means 23 is supplied with the inverter DC current idc2 of the inverter circuit 2. The inverter DC current idc2 can be calculated as a difference between the converter DC current idc1 and the condenser current ic detected by the current detectors 3 and 4, respectively, by the following expression (2). This calculation can be made before the A-D conversion or after A-D conversion of the A-D conversion means 21. As described above, in the embodiment, one current detector can be deleted. Particularly, since only switching ripple in the power converter circuit flows through the smoothing condenser 10 basically, loss in current detection is small as compared with the provision of the current detector that directly detects the inverter DC current idc2 and accordingly high efficiency can be attained.

$$idc2 = idc1 - ic \qquad (2)$$

The inverter circuit control means 23 includes current reproduction means 200 for calculating three-phase AC currents for U-, V- and W-phases on the basis of the inputted inverter DC current idc2, a 3Φ/dq converter 201 for converting the three-phase AC currents into a d2q2-axis current by dq conversion, a voltage command (Vd2c* and Vq2c*) preparation unit 203, a dq/3Φ converter 204 for coordinate-converting d2q2-axis into three-phase axes, a pulse generator 205 for generating PWM pulse signals, a magnetic pole position presumption unit 206, a magnetic pole position compensator 207 for suppressing a deviation between the magnetic pole position error Δθc presumed by the magnetic pole position presumption unit 206 and a magnetic pole position error command Δθc* (=0) to zero and a magnetic pole position calculator 208 for calculating the magnetic pole position. The basic configuration of the inverter circuit control means 23 is the same as the converter circuit control means 22 and the inverter circuit control means 23 includes a voltage loop for calculating a voltage command value and a magnetic pole position loop for presuming the magnetic pole position.

The voltage loop for calculating the voltage command value is first described. The current reproduction means 200 is supplied with the inverter DC current idc2 and reproduces the three-phase AC currents for U-, V- and W-phases. In the reproduction method, as described with reference to FIG. 5, the W-phase input current of the opposite polarity can be observed in sections that the only lower arm for W-phase is on and the upper arms for U- and V-phases are on. Further, the U-phase input current of the same polarity can be observed in sections that the lower arms for V- and W-phases are on and the only upper arm for U-phase is on. The reproduced three-phase AC currents are coordinate-converted into d2cq2c-axis currents (id2c and iq2c) by the 3Φ/dq converter 201. The coordinate-converted q2c-axis current is filtered by a low-pass filter (LPF) 202 to thereby obtain q2-axis current command iq2*. The voltage command preparation unit 203 makes vector operation in accordance with the following expressions (3) on the basis of d2-axis current command id2*, q2-axis current command iq2* and angular speed command ωi* and produces d2-axis voltage current Vd2* and q2-axis voltage command Vq2* to supply them to the dq/3Φ converter 204 and the magnetic pole position presumption unit 206.

$$Vd2^* = R1i \times id2^{**} - \omega i^* \times Lq2 \times iq2^*$$

$$Vq1^* = R1i \times iq2^{**} + \omega i^* \times Ld2 \times id2^{**} + \omega i^* \times Ke \qquad (3)$$

where R1i is a winding resistance of the motor 8, Ld2 an inductance for d2-axis, Lq2 an inductance for q2-axis and Ke a power generation constant.

The dq/3Φ converter 204 coordinate-converts d2-axis voltage command Vd2* and q2-axis voltage command Vq2* into three-phase inverter voltage command signals 220. The pulse generator 205 produces PWM pulse signals 13 for driving the IGBTs for respective phases on the basis of the three-phase inverter voltage command signals 220. The magnetic pole position loop for presuming the magnetic pole position is configured in the same manner as the phase loop in the converter circuit control means 22 with the exception that only control constants are changed.

As an example of cooperation operation between the converter circuit 1 and the inverter circuit 2, there is delivery or transfer of the DC voltage command Edc*. The DC voltage Edc required by the inverter circuit 2 can be easily calculated by the voltage command preparation unit 203 of the inverter circuit control means 23. Accordingly, the DC voltage Edc calculated by the voltage command preparation unit 203 is delivered or transferred to the converter circuit control means 22 to vary the DC voltage command Edc* in the converter circuit control means 22, so that the DC voltage command Edc* is made large when load is heavy and the DC voltage command Edc* is made small when load is light to thereby make it possible to improve the efficiency of the system including the converter circuit 1, the inverter circuit 2 and the motor 9 and realize saving of energy.

In the embodiment, the converter that is characteristic of the present invention is used to configure the power converter used to drive the motor by way of example. However, the present invention is not limited thereto and the power converter including only the converter can be configured without the provision of the inverter. Further, only the converter can be packaged.

Embodiment 2

Figure 7:
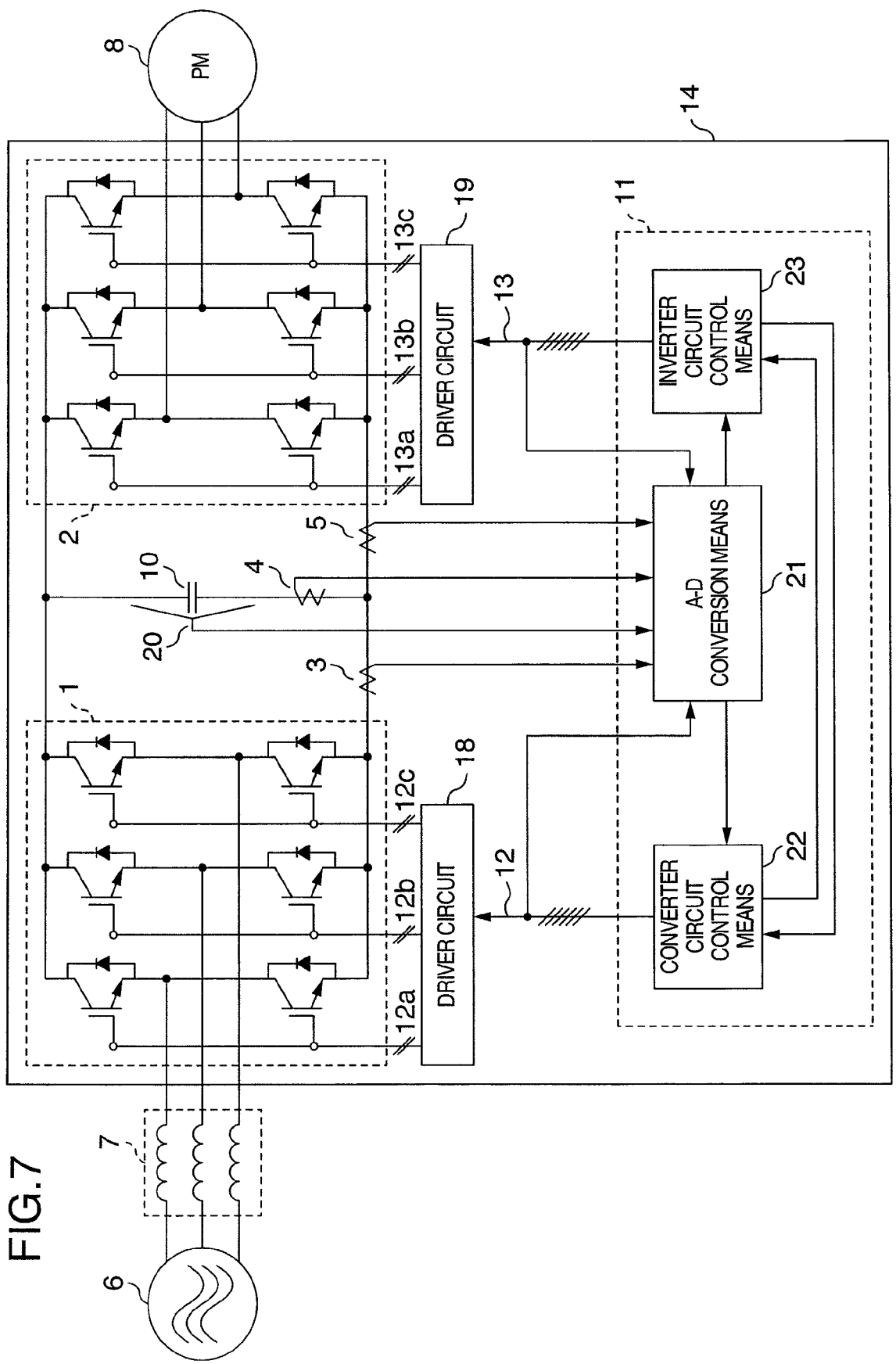
FIG. 7 is a detailed configuration diagram illustrating a power converter according to another embodiment of the present invention.

A second embodiment of the power converter according to the present invention is shown in FIG. 7. The second embodiment is different from the embodiment of FIG. 1 in that a current detector 5 for directly detecting the inverter DC current idc2 of the inverter circuit 2 is provided in addition to the current detector 3 for detecting the converter DC current idc1 of the converter circuit 1 and the current detector 4 for detecting the condenser current ic flowing through the smoothing condenser 10. According to the second embodiment, the calculation of the expression (2) for calculating the inverter DC current idc2 on the basis of the converter DC current idc1 and the condenser current ic can be omitted as compared the embodiment of FIG. 1.

Embodiment 3

Figure 8:
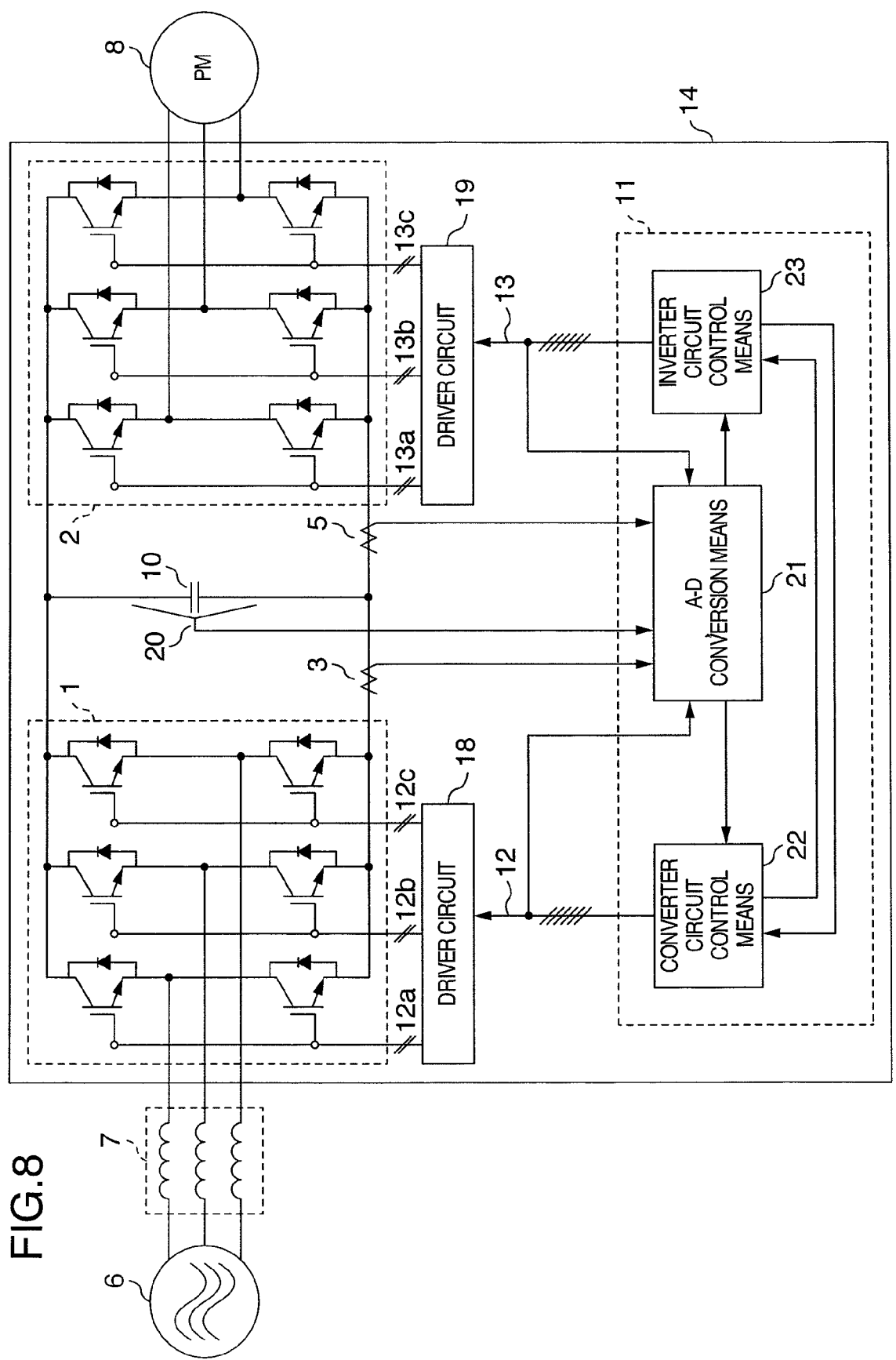
FIG. 8 is a detailed configuration diagram illustrating a power converter according to another embodiment of the present invention.

A third embodiment of the power converter according to the present invention is shown in FIG. 8. The third embodiment is different from the embodiment of FIG. 1 in that the current detector 5 for directly detecting the inverter DC current idc2 of the inverter circuit 2 is provided instead of the current detector 4 for detecting the condenser current ic flowing through the smoothing condenser 10. Accordingly, the condenser current ic flowing through the smoothing condenser 10 is calculated on the basis of the converter DC current idc1 and the inverter DC current idc2 by the following expression (4).

$$ic = idc1 - idc2 \qquad (4)$$

According to the embodiment, the power converter 14 is characterized by the configuration that is symmetrical about the smoothing condenser 10. Accordingly, the functions of the converter circuit 1 and the inverter circuit can be exchanged and accordingly even if the power supply is connected to either of the converter circuit 1 and the inverter circuit 2, the functions of the control means 22 of the converter circuit 1 and the control means 23 of the inverter circuit 2 can be exchanged to thereby perform desired operation.

However, it is necessary to decide which of the converter circuit 1 and the inverter circuit 2 the power supply is connected to before usual operation. An example of the decision method is now described. In the following description, an AC power supply is connected to the AC side of the converter circuit 1 and an AC load is connected to the AC side of the inverter circuit 2 in FIG. 8.

Figure 9:
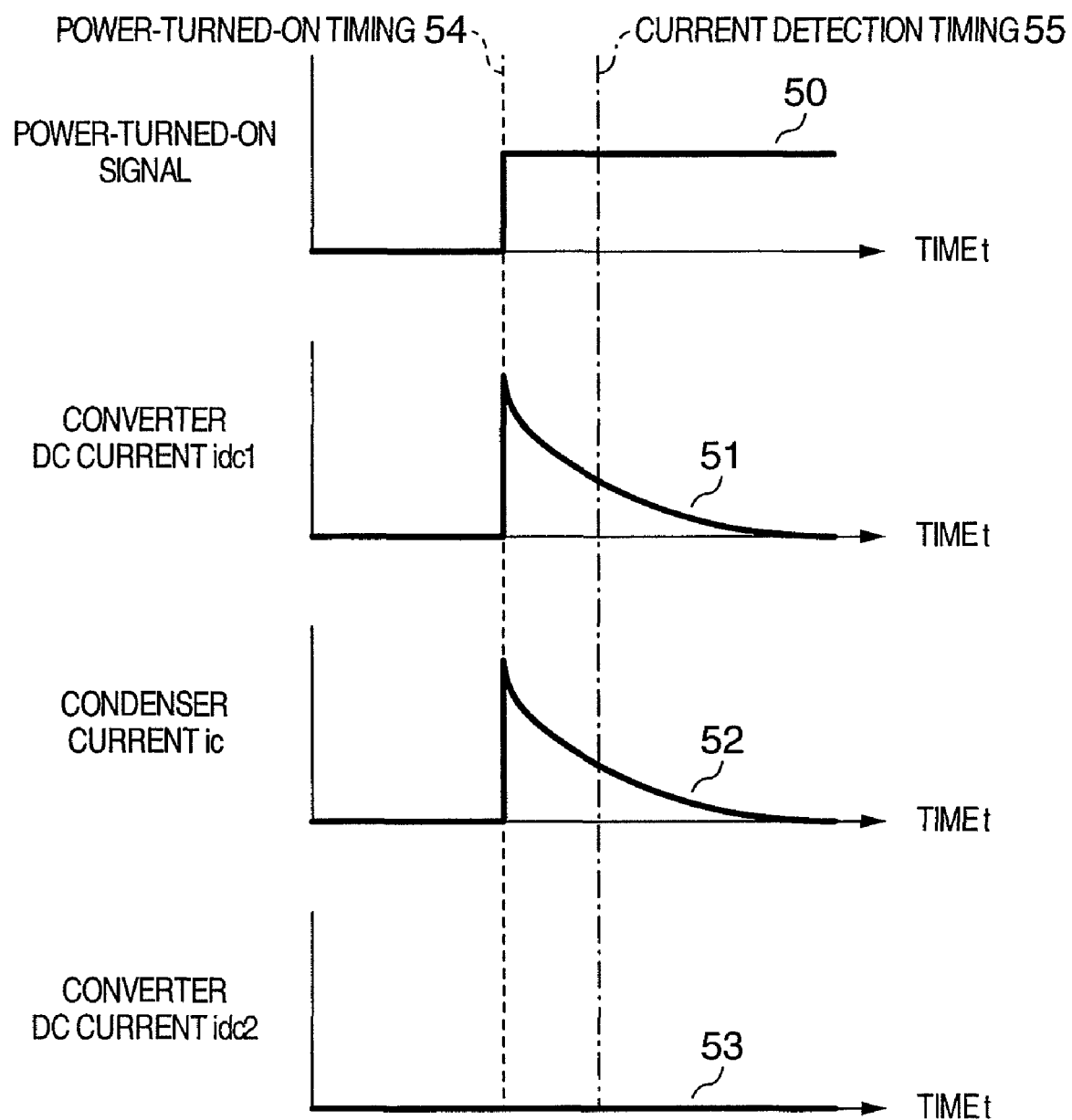
FIG. 9 is a diagram explaining an example of a method of deciding a terminal to which a power supply is connected in the embodiment of FIG. 8.

An example of the decision method performed just after turning on of the power supply is now described with reference to FIG. 9. FIG. 9 shows a waveform 50 of a power-turned-on signal, a waveform 51 of the converter DC current idc1, a waveform 52 of the condenser current ic and a waveform 53 of the inverter DC current idc2. When the power converter 14 is connected to the power supply in response to the power-turned-on signal 50, an initial charging current flows through the smoothing condenser 10. The initial charging current flows through the loop including AC power supply 6→reactor 7→diode connected in inverse-parallel to the semiconductor switching device of the upper arm for any phase→smoothing condenser 10→diode connected in inverse-parallel to the semiconductor device of the lower arm for any phase→reactor 7→AC power supply 6. Accordingly, when currents are detected at a current detection timing 55 after a power-turned-on timing 54, the current detectors 3 and 4 can detect the currents 51 and 52 as shown in FIG. 9. That is, which of the current detectors 3 and 4 can detect a current is decided to thereby make it possible to decide which of the converter circuit 1 and the inverter circuit 2 the power supply is connected to.

Figure 10:
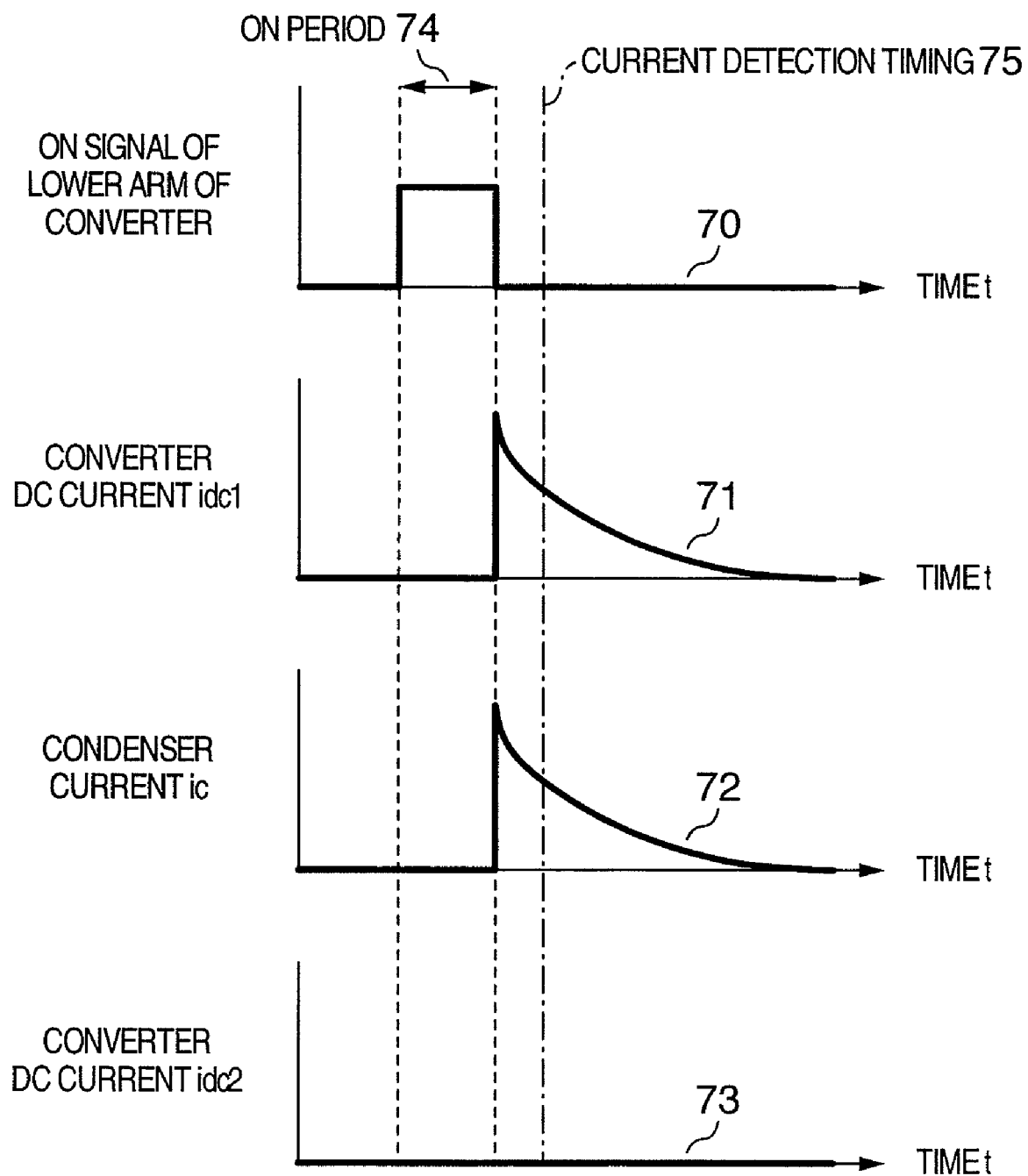
FIG. 10 is a diagram explaining another example of a method of deciding a terminal to which a power supply is connected in the embodiment of FIG. 8.
Figure 11:
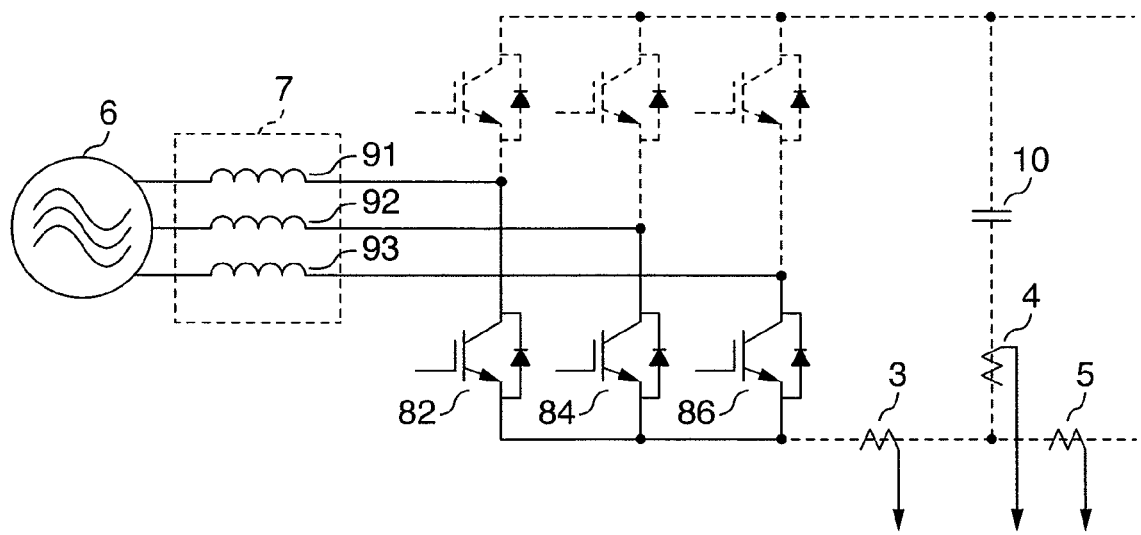
FIG. 11 is a diagram explaining operation of the decision method of FIG. 10.
Figure 12:
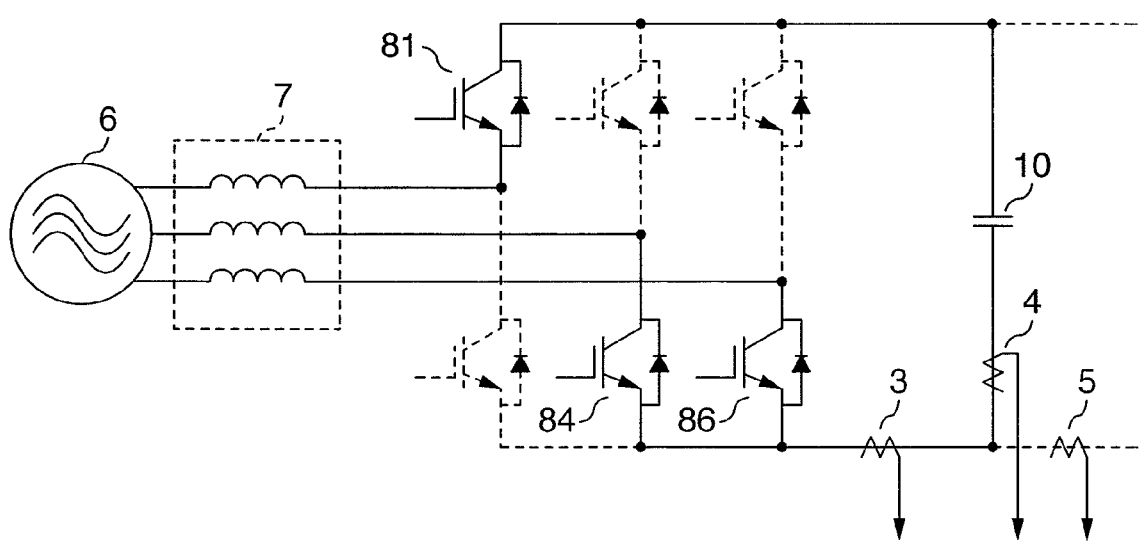
FIG. 12 is a diagram explaining operation of the decision method of FIG. 10.

On the other hand, when the smoothing condenser 10 is already charged, the method of FIG. 9 cannot make the decision. An example of the decision method in this case is described with reference to FIGS. 10 to 12. FIG. 10 shows a waveform of an on signal 70 of the lower arm of the converter circuit 1, a waveform 71 of the converter DC current idc1, a waveform 72 of the condenser current ic and a waveform 73 of the inverter DC current idc2. The on signal 70 of the lower arm of the converter circuit 1 is a signal that drives the semiconductor switching devices of the lower arms for the R-, S- and T-phases and when it is high level, the on signal 70 turns on the semiconductor switching devices. That is, the lower arms of all the phases of the converter circuit 1 are turned on during an on period 74 of FIG. 10. At this time, for example, when the voltage for R-phase is highest and the voltages for S- and T-phases are negative, a current flows through the loop including AC power supply 6→reactor 91 for R-phase→semiconductor switching device of lower arm for R-phase→semiconductor switching devices of lower arms for S- and T-phase→reactors 92 and 93 for S- and T-phases→AC power supply 6 as shown by solid line of FIG. 11. This current stores energy in the reactors 7. Thereafter, when the semiconductor switching devices of the lower arms for R-, S- and T-phases are turned off, a current flows through the loop including AC power supply 6→reactor 91 for R-phase→semiconductor switching device 81 (diode connected in inverse-parallel thereto) of the upper arm for R-phase →smoothing condenser 10→semiconductor switching devices of the lower arms for S- and T-phases→reactors 92 and 93 for S- and T-phases→AC power supply 6 and the energy stored in the reactors 7 is moved to the smoothing condenser 10. This current flows after the on period 74 as shown by the converter DC current (idc1) 71 and the condenser current (ic) 72 of FIG. 10. If an AC load is connected to the converter circuit 1 instead of the AC power supply 6, no current flows even if the semiconductor switching devices of the lower arms for R-, S- and T-phases are turned on and off. Accordingly, the current detection is made at the current detection timing 75 after the on period 74, so that it can be decided which of the converter circuit and the inverter circuit the power supply is connected to.

When the semiconductor switching devices of the lower arms for all the phases of the converter circuit 1 are turned on, the direction of currents flowing through the reactors 91 to 93 for the respective phases depends on the phase of the AC power supply at the time that the semiconductor switching devices of the lower arms are turned on, while even when the semiconductor switching devices of the lower arms are turned on at any time, the AC power supply 6 is short-circuited through the reactors 7 to store energy in the reactors 7 and the converter DC current idc flows through the smoothing condenser 10 due to movement of the energy. Accordingly, the timing of the on period 74 of the lower arms is not required to be prescribed particularly.

As described above, according to the embodiment, it is decided which of the converter circuit and the inverter circuit the AC power supply 6 is connected to and the input/output relation of the converter control means 22 and the inverter control means 23 can be exchanged after the decision to thereby make operation even if which of the converter circuit and the inverter circuit the power supply is connected to. That is, even if input/output wiring of the power converter 14 is made in error, the power converter can be operated. Consequently, not only is the freedom of wiring increased but also when the power converter 14 of the present invention is applied to a compressor driving system of a packaged-type air-conditioner, it is not necessary to change wiring when a power converter that is already installed in an outdoor unit of the packaged-type air-conditioner is replaced. Particularly, maintenance can be improved very effectively.

Embodiment 4

Figure 13:
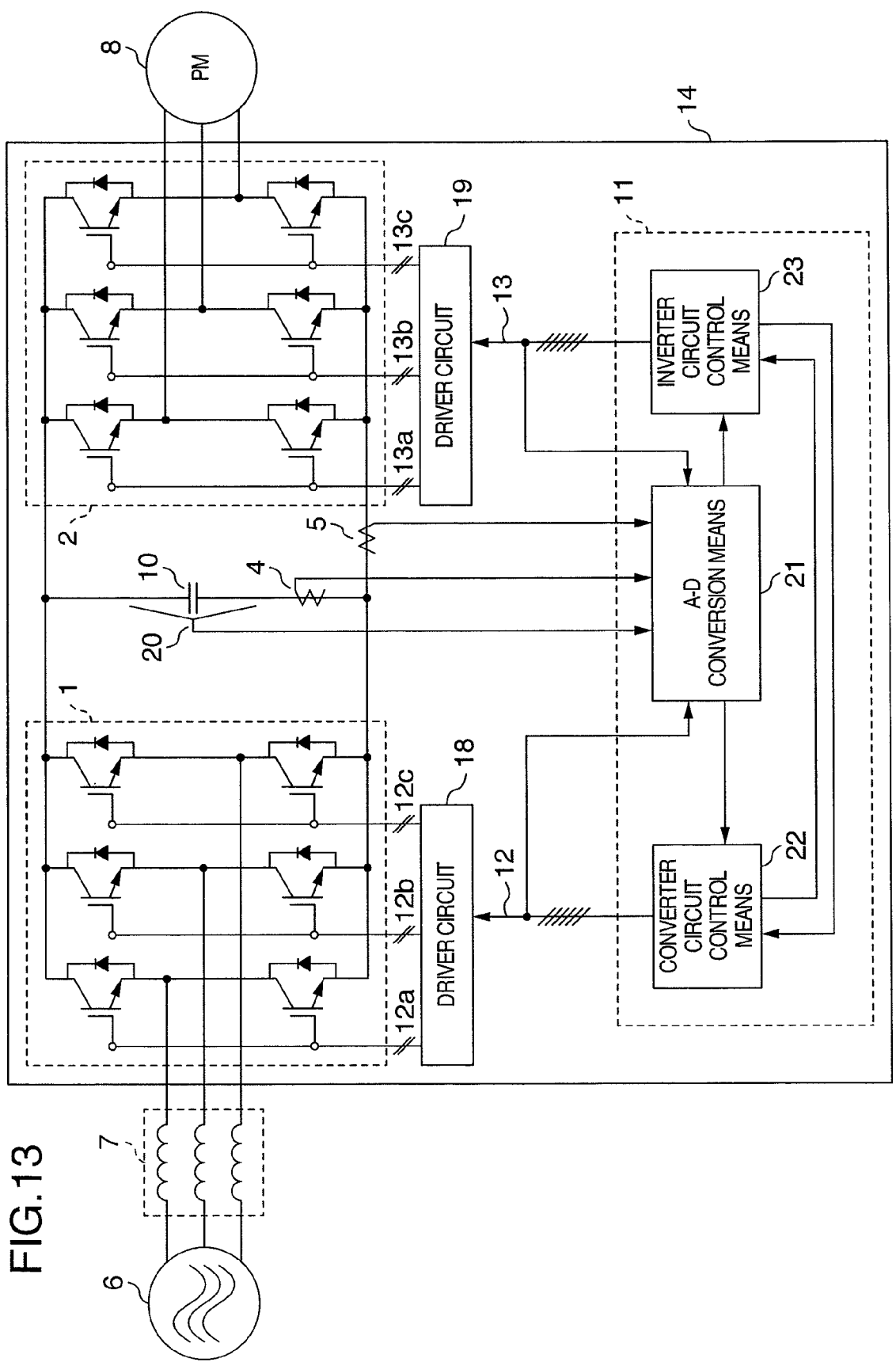
FIG. 13 is a detailed configuration diagram illustrating a power converter according to another embodiment of the present invention.

A fourth embodiment of the power converter according to the present invention is shown in FIG. 13. The fourth embodiment is different from the embodiment of FIG. 1 in that the current detector 5 for directly detecting the inverter DC current idc2 of the inverter circuit 2 is provided instead of the current detector 3 for detecting the converter DC current idc1. Accordingly, the converter DC current idc1 is calculated on the basis of the condenser current ic flowing through the smoothing condenser 10 and the inverter DC current idc2 by the following expression (5).

$$idc1 = ic + idc2 \tag{5}$$

According to the embodiment, since electric power containing all losses included in the smoothing condenser 10, the inverter circuit 2 and the motor 8 is inputted in the converter side, the converter DC current idc1 is larger than the inverter side. Further, since only switching ripples of the power converter circuit flow through the smoothing condenser 10 basically, the absolute value of the current flowing through the smoothing condenser 10 is very small as compared with the two power converter circuits. Accordingly, the configuration shown in the embodiment can be used to thereby reduce losses in the DC current detector on the converter side and improve the efficiency as compared with other embodiments.

Embodiment 5

Figure 14:
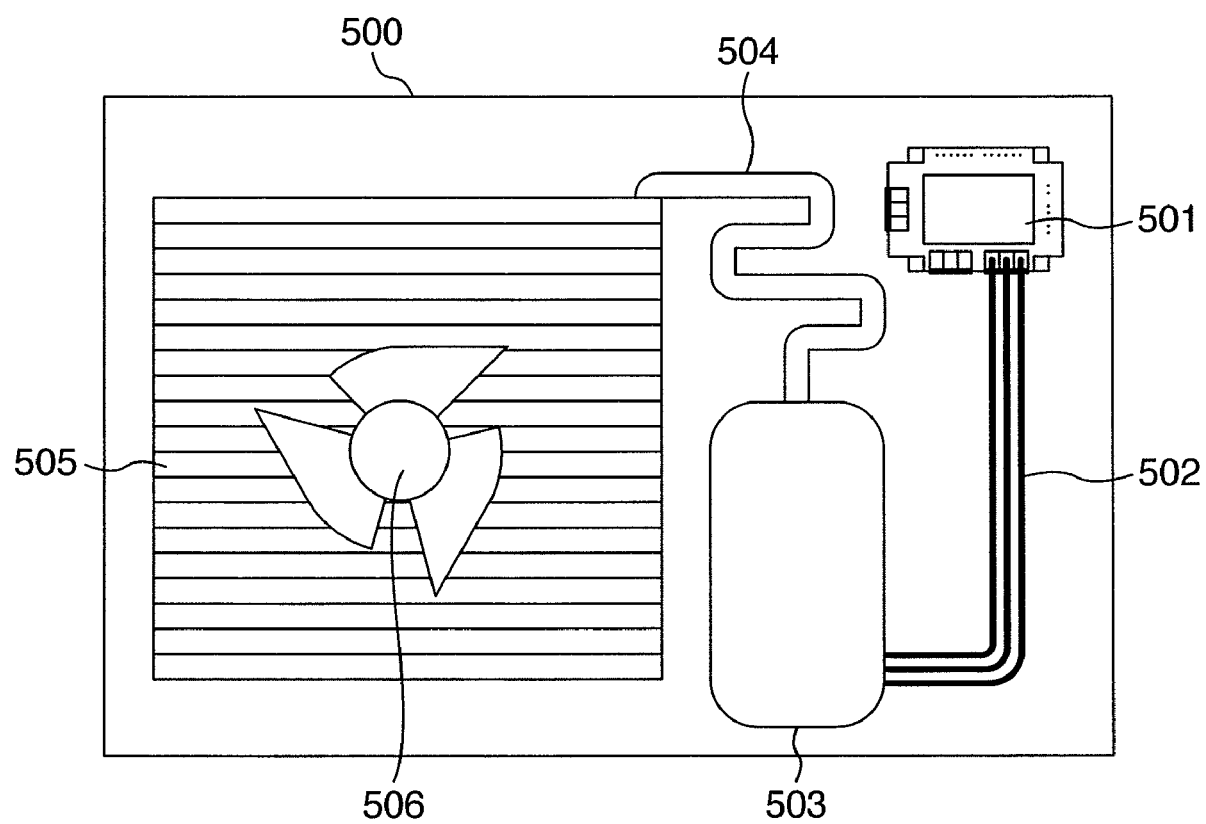
FIG. 14 is a schematic diagram illustrating an outdoor unit of an air-conditioner in which the power converter of the present invention is applied to drive a compressor thereof.

FIG. 14 is a schematic diagram illustrating an outdoor unit 50 of an air-conditioner in which the power converter 14 of the present invention is applied to drive a compressor thereof. The packaged-type power converter 501 is connected to a compressor 503 through wiring 502 and drives a motor in the compressor 503 to compress refrigerant. The compressed high-pressure refrigerant passes through piping 504 and a heat exchanger 505 to radiate heat. Although not shown, there is an indoor unit paired with the outdoor unit 500. The refrigerant has reduced pressure in a heat exchanger of the indoor unit to absorb heat and is returned to the compressor 503. The flow of the refrigerant in the heating operation is reverse to that in the cooling operation and heat is radiated in a heat exchanger of the indoor unit in the heating operation. The power converter 14 is packaged to thereby facilitate maintenance upon failure.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power converter of packaged type comprising
a main circuit board in which two sets of power converter circuits each including a plurality of bridge-connected semiconductor switching devices are connected to each other through a DC circuit, a controller board in which a controller for controlling said plurality of semiconductor switching devices for said two sets of power converter circuits is formed and a package in which said main circuit board is provided and on which said controller board is placed to connect therebetween,
said package including two sets of AC terminals connected to said two sets of power converter circuits, respectively, an external terminal for a smoothing condenser connected in parallel to said DC circuit and an external terminal connected to said controller, all said terminals being disposed at periphery of said package,
said main circuit board including at least two current detectors for detecting a DC current flowing through said external terminal for said smoothing condenser and DC currents in said power converter circuits,
wherein said controller includes decision means for deciding an AC terminal connected to an AC power supply on the basis of a detected current of said at least one current detector and means for controlling to operate said power converter circuit connected to said AC power supply as a converter and to operate the other power converter circuit as an inverter on the basis of decision result of said decision means.

2. A power converter of packaged type comprising
a main circuit board in which two sets of power converter circuits each including a plurality of bridge-connected semiconductor switching devices are connected to each other through a DC circuit, a controller board in which a controller for controlling said plurality of semiconductor switching devices for said two sets of power converter circuits is formed and a package in which said main circuit board is provided and on which said controller board is placed to connect therebetween,
said package including two sets of AC terminals connected to said two sets of power converter circuits, respectively, an external terminal for a smoothing condenser connected in parallel to said DC circuit and an external terminal connected to said controller, all said terminals being disposed at periphery of said package,
said main circuit board including at least two current detectors for detecting a DC current flowing through said external terminal for said smoothing condenser and DC currents in said power converter circuits,
wherein said controller includes decision means for deciding an AC terminal connected to an AC power supply on the basis of a detected current of said at least one current detector after said semiconductor switching devices of lower arms for one of said two sets of power converter circuits are turned on and means for controlling to operate said power converter circuit connected to said AC power supply as a converter and to operate the other power converter circuit as an inverter on the basis of decision result of said decision means.

3. A power converter of packaged type according to claim 1, wherein said controller includes current calculation means for calculating a current in a part where said current detector is not provided on the basis of two detected current values detected by said two current detectors.

4. A power converter of packaged type according to claim 1, wherein said controller controls said plurality of semiconductor switching devices for one of said two sets of power converter circuits so that said DC current flowing through the external terminal for said smoothing condenser is controlled to be a set value.

5. A power converter of packaged type according to claim 1, wherein said at least two current detectors each include a shunt resistor.

6. A power converter of packaged type according to claim 5, wherein said at least two shunt resistors each have one terminal connected to the same potential.

7. An air-conditioner comprising said power converter of packaged type according to claim 1 and a motor of a compressor that is driven by said power converter.

8. A power converter of packaged type according to claim 2, wherein said controller includes current calculation means for calculating a current in a part where said current detector is not provided on the basis of two detected current values detected by said two current detectors.

9. A power converter of packaged type according to claim 2, wherein said controller controls said plurality of semiconductor switching devices for one of said two sets of power converter circuits so that said DC current flowing through the external terminal for said smoothing condenser is controlled to be a set value.

10. A power converter of packaged type according to claim 2, wherein said at least two current detectors each include a shunt resistor.

11. A power converter of packaged type according to claim 10, wherein said at least two shunt resistors each have one terminal connected to the same potential.

12. An air-conditioner comprising said power converter of packaged type according to claim 2 and a motor of a compressor that is driven by said power converter.

* * * * *